US007779965B2

(12) United States Patent
Marze

(10) Patent No.: US 7,779,965 B2
(45) Date of Patent: Aug. 24, 2010

(54) ABSORBENT STRUCTURE FOR ATTENUATING NOISE PARTICULAR BY A ROTOR-GENERATOR NOISE, AND A ROTOR DUCT INCLUDING SUCH A STRUCTURE

(75) Inventor: Henri-James Marze, Rognac (FR)

(73) Assignee: Eurocopter, Marignane (FR)

( * ) Notice: Subject to any disclaimer, the term of this patent is extended or adjusted under 35 U.S.C. 154(b) by 12 days.

(21) Appl. No.: 12/330,610

(22) Filed: Dec. 9, 2008

(65) Prior Publication Data

US 2009/0152395 A1 Jun. 18, 2009

(30) Foreign Application Priority Data

Dec. 14, 2007 (FR) .................................. 07 08699

(51) Int. Cl.

*E04B 1/82* (2006.01)
*F02K 1/82* (2006.01)
*B64C 1/40* (2006.01)
*B64C 27/82* (2006.01)

(52) U.S. Cl. ....................... 181/292; 181/213; 181/284; 181/286; 181/290; 244/1 N; 244/17.19

(58) Field of Classification Search ................. 181/292, 181/290, 213, 284, 286; 244/1 N, 17.19

See application file for complete search history.

(56) References Cited

U.S. PATENT DOCUMENTS

| | | | | | |
|---|---|---|---|---|---|
| RE22,595 | E | * | 1/1945 | Upson | 244/17.19 |
| 3,191,851 | A | * | 6/1965 | Wood | 415/119 |
| 4,384,634 | A | * | 5/1983 | Shuttleworth et al. | 181/213 |
| 4,410,065 | A | * | 10/1983 | Harvey | 181/224 |
| 5,175,401 | A | * | 12/1992 | Arcas et al. | 181/292 |
| 5,634,611 | A | * | 6/1997 | Marze et al. | 244/17.19 |
| 6,114,652 | A | * | 9/2000 | Clarke et al. | 219/121.71 |
| 6,179,086 | B1 | * | 1/2001 | Bansemir et al. | 181/292 |
| 6,360,844 | B2 | * | 3/2002 | Hogeboom et al. | 181/213 |
| 6,615,950 | B2 | | 9/2003 | Porte et al. | |
| 6,851,515 | B2 | * | 2/2005 | Dussac et al. | 181/284 |
| 2006/0219477 | A1 | | 10/2006 | Ayle | |

FOREIGN PATENT DOCUMENTS

| | | | |
|---|---|---|---|
| DE | 295 12 787 U 1 | | 8/1995 |
| EP | 1 213 703 | A1 | 6/2002 |
| FR | 2 482 663 | | 4/1981 |
| FR | 2 674 362 | | 3/1992 |
| GB | 2 059 341 | A | 4/1981 |
| WO | 03/106263 | A1 | 12/2003 |

OTHER PUBLICATIONS

Search report corresponding to French Application 0708699.

* cited by examiner

*Primary Examiner*—Jeffrey Donels
*Assistant Examiner*—Christina Russell
(74) *Attorney, Agent, or Firm*—Young & Thompson

(57) ABSTRACT

An absorbent structure for reducing the propagation of soundwaves emitted by noisy devices such as rotors or motors, the structure includes a rigid partition (1), at least one porous wall (4), and separator elements (2) for placing the porous wall (4) at a determined distance from the rigid partition (1), defining cavities (3) of a height h1 between the porous wall (4) and the rigid partition (1), the height h1 being determined to obtain maximum absorption of a given frequency of the emitted soundwaves, wherein includes additional absorption elements for obtaining maximum absorption of at least one additional frequency of the emitted soundwave.

10 Claims, 3 Drawing Sheets

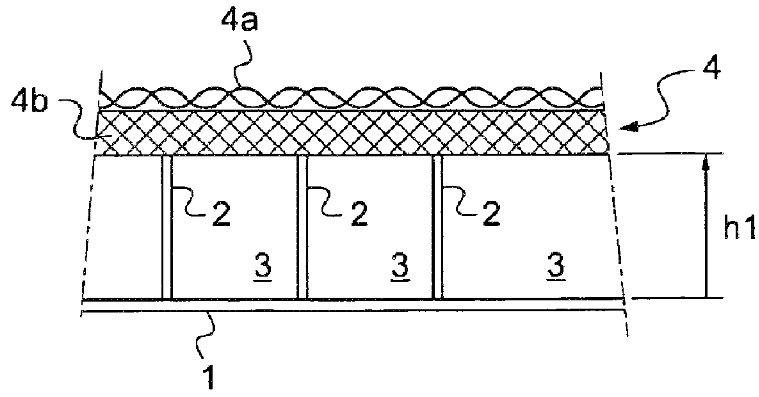
Fig. 1
Prior Art
Fig. 2
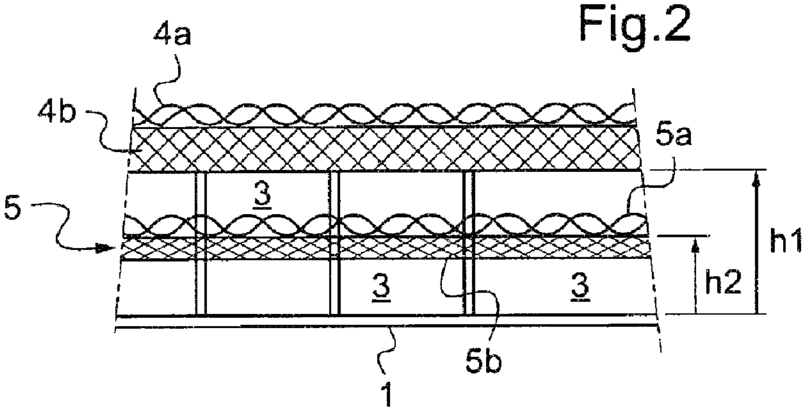
Fig. 3
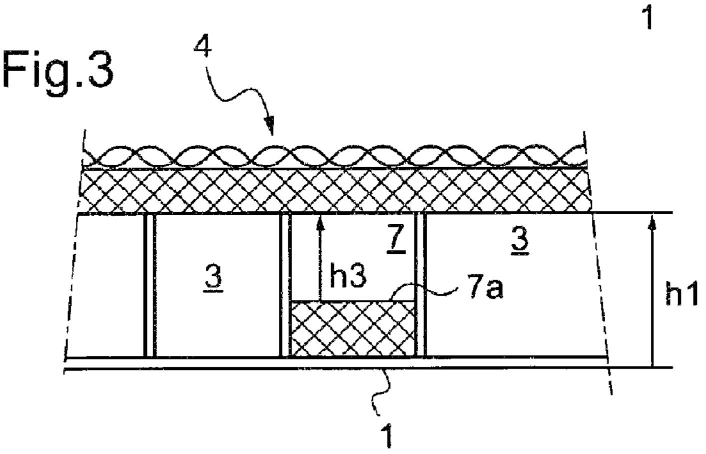
Fig. 4
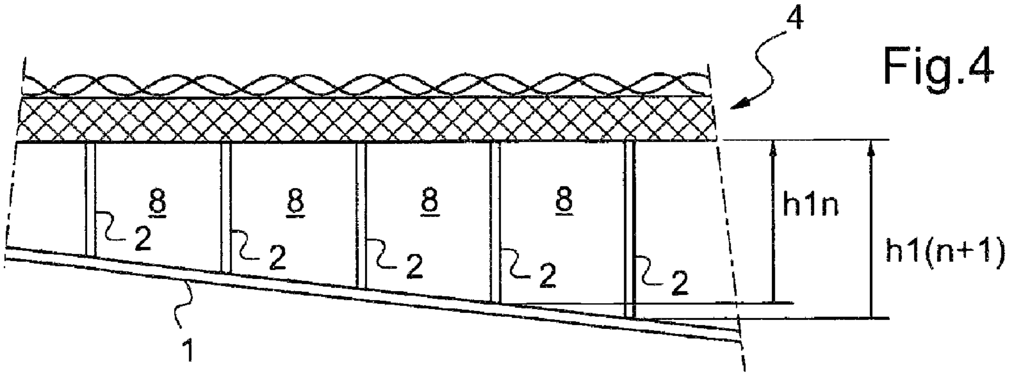

Fig.7
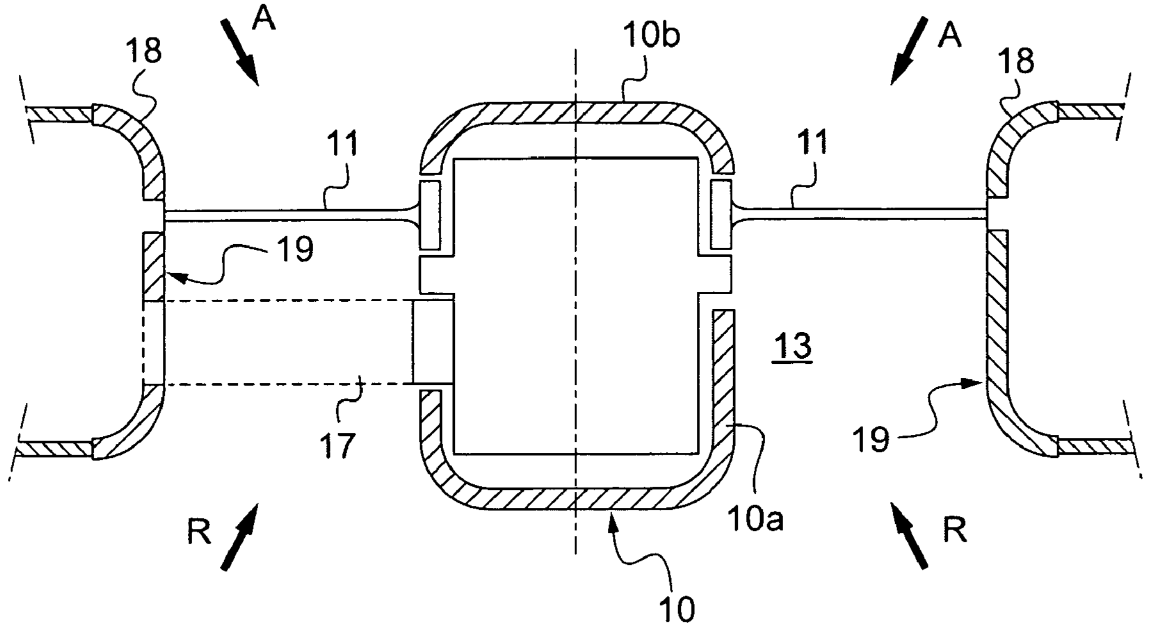
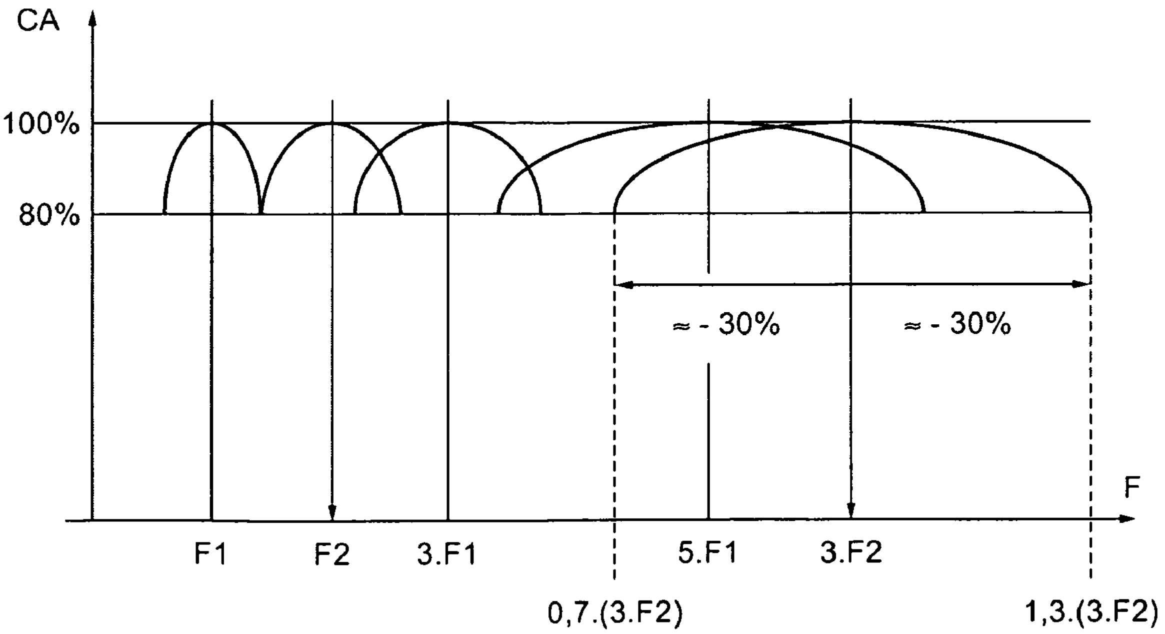
Fig.8

ABSORBENT STRUCTURE FOR ATTENUATING NOISE PARTICULAR BY A ROTOR-GENERATOR NOISE, AND A ROTOR DUCT INCLUDING SUCH A STRUCTURE

FIELD OF THE INVENTION

The present invention relates to the general technical field of processing sound so as to reduce the sound nuisance that is emitted by rotors, motors, etc. Such acoustic processing is often essential in the field of aviation, and in particular for helicopters.

More particularly, the present invention relates to acoustic processing of the duct of a ducted antitorque rotor, also known as a "fenestron".

BACKGROUND OF THE INVENTION

In general, in the noise spectrum generated by a ducted antitorque tail rotor and by the resulting flow of air, there can be found lines corresponding to pure sounds at a frequency that is related to the speed of rotation of the rotor, to the number of rotor blades, to the geometrical configuration of the rotor and an air flow deflector, and to the shape and the structure of the duct.

Any rotor rotating in a duct that is fed with air that is turbulent to a greater or lesser extent will generate soundwaves that may be organized or random.

Organized waves constitute that which is commonly referred to as "rotational noise", which is characterized in the noise spectrum by discrete frequencies (lines) corresponding to the rotary frequencies of the blades, and of the transmission shaft, and to their harmonics and sub-harmonics, or to frequencies that are modulated by angular phase shifting of the blades or of the speed of rotation.

Random waves are characterized in the noise spectrum by high spectral density over a very broad band of frequencies. These random waves generate so-called "broadband" noise.

It is known to use absorbent structures to reduce the propagation of soundwaves emitted by noisy devices such as rotors or motors, such structures comprising a rigid partition, a porous wall, and separator means for placing the porous wall at a determined distance from the rigid partition, with cavities being defined between said porous wall and the rigid partition, the cavities being of height that is determined to maximize absorption of a given frequency in the emitted soundwaves.

So-called "quarter-wave" materials are thus known that present cavities of a height corresponding to one-fourth of the wavelength of the basic frequency that is to be absorbed as a priority. Nevertheless, such materials suffer from a certain number of drawbacks.

In a certain number of applications, and in particular in applications relating to ducted antitorque rotors for helicopters, the audible soundwaves emitted are usually made up both of random waves and of organized waves distributed over a broad band of frequencies, causing known materials to present performance that is not sufficient for effective attenuation of the soundwaves made up in this way under all flying conditions. For example it is necessary to process pure sounds and their harmonics, but it is also necessary to process noise sources that operate over a broad range of speed variation as occurs with aircraft in operation over a temperature range extending from −40° C. to +40° C. The parasitic noise sources that need to be processed are therefore numerous and very diverse.

By way of example, U.S. Pat. No. 6,114,652 describes a method of making acoustic attenuation chambers from a honeycomb structure. The cells have at least two absorbent and porous layers having perforations formed therein by means of a laser. The material constituting the layers is based on polymers and is selected for its properties of absorbing energy at a given radiation frequency of the laser. The layers thus present perforations of different diameters that are distributed differently, in order to optimize acoustic absorption properties.

That document describes an absorbent structure for reducing soundwave propagation that comprises a rigid partition, at least one porous wall, and separation means for placing the porous wall at a predetermined distance from the rigid partition, thereby defining cavities of a given height between said porous wall and said rigid partition.

OBJECTS AND SUMMARY OF THE INVENTION

Consequently, the objects of the present invention seek to provide a novel absorbent structure enabling pure sounds to be absorbed and also presenting high effectiveness in absorbing soundwaves over a broad frequency band. The absorbent structure in accordance with the invention thus serves to process groups of pure sounds and/or so-called "broadband" sounds. This achieves a substantial and audible reduction in the parasitic noise that is generated.

Another object of the present invention is to propose an absorbent structure that constitutes both an acoustic covering and also a rigid structural element. Thus, in the application relating to ducted antitorque rotors for helicopters, the absorbent structure constitutes the airflow duct of such an antitorque rotor.

Another object of the present invention is to propose an absorbent structure that does not significantly increase the weight and/or the bulk of elements on which or in which it is used, by replacing elements made solely out of sheet metal or simple walls made of composite materials.

The objects given to the present invention are achieved with the help of an absorbent structure for reducing the propagation of soundwaves emitted by noisy devices such as rotors or motors, the structure comprising a rigid partition, at least one porous wall, and separator means for placing the porous wall at a determined distance from the rigid partition, defining cavities of a height h1 between said porous wall and said rigid partition, said height h1 being determined so as to obtain maximum absorption of a given basic frequency F1 of the emitted soundwaves, said structure including additional absorption means for obtaining maximum absorption of the emitted soundwaves at least one additional basic frequency Fi of the emitted soundwave spectrum, i being an integer greater than or equal to 2, wherein the porous wall comprises at least a first layer constituted by a fine-mesh screen, and at least one second layer constituted by a fiber felt.

Associating these two layers makes it possible firstly to optimize porosity and secondly to hold the felt sufficiently securely, by virtue of the screen.

The additional absorption means, in combination with the porous wall and the cavities, thus serves to obtain a maximum absorption coefficient of 100% for at least one basic frequency F1 and for an additional basic frequency Fi, and to obtain an absorption coefficient substantially equal to 80% around said basic frequencies F1 and Fi, over a broad band of frequencies, e.g. extending form 0.7×Fi to 1.3×Fi.

The absorbent structure in accordance with the invention also presents the advantage of presenting not only maximum attenuation for each of the basic frequencies F1 or Fi, but also maximum attenuation for multiples of the basic frequencies corresponding to (2n+1)×Fi, where n is an integer number greater than or equal to 1.

By way of example, it is possible to obtain 100% attenuation of noise at center frequencies F1 of 1000 hertz (Hz) and F2=2×F1 of 2000 Hz, together with 80% attenuation of noise over frequency ranges extending preferably from a value of two-thirds of each of the basic frequencies to a value of four-thirds of each of said basic frequencies. The total attenuation of a spectrum line at 1000 Hz is thus accompanied by attenuation at about 80% of other noise spectrum lines, representative of noise lying in the range 667 Hz to 1333 Hz, and preferably lying in the range 700 Hz to 1300 Hz, and also to noise lying in the range 1400 Hz to 2600 Hz.

In an embodiment in accordance with the invention, the additional absorption means comprise an additional porous wall located within the cavities, at an intermediate height h2. The heights h1 and h2 consequently correspond respectively to attenuating respective frequencies F1 and F2. The cavities of height h1 and h2 are thus disposed in parallel, thereby reducing the thickness occupied by the absorbent structure compared with a disposition of two successive cavities of heights h1 and h2 in series.

In another embodiment in accordance with the invention, the additional absorption means are implemented by an inclination of the rigid partition relative to the porous wall so as to modify the height h1 continuously, in at least one direction, from one cavity to the next. Such a design serves to enhance noise processing over a broad frequency band. In another embodiment in accordance with the invention, it is thus advantageous to associate these additional absorption means with additional absorption means that enhance noise processing at one or more basic frequencies Fi.

In another embodiment in accordance with the invention, the additional absorption means comprise an alternation of cavities of height h1 and additional cavities of height h3, said height h3 being less than the height h1. By way of example, these additional cavities of height h3 are made by depositing an absorbent material on the rigid partition in some of the cavities of height h1, e.g. in every other cavity.

Without going beyond the ambit of the present invention, it is possible, in certain circumstances, to envisage combining various ones of the above-described embodiments to improve the performance of the absorbent structure.

In an embodiment of the absorbent structure in accordance with the invention, the cavities are defined by using upright partitions that extend substantially orthogonally from the rigid partition up to a porous wall.

In an embodiment of the absorbent structure in accordance with the invention, the screen and/or the felt is/are preferably made of metal or of composite materials.

In an embodiment of the absorbent structure in accordance with the invention, the first layer and the second layer are assembled together by welding or by adhesive bonding. These operations, and also assembling a porous wall to the rigid partition defining the cavities, can easily be automated during fabrication of the absorbent structure.

In an embodiment of the absorbent structure in accordance with the invention, the rigid partition is preferably made of fiberglass. The same preferably applies to the upright partitions. This obtains stiffness, strength, and light weight, as are required in particular in the field of helicopters.

The objects given to the present invention are also achieved with the help of a duct for a helicopter antitorque rotor, the duct being constituted at least in part by an absorbent structure as described above.

The objects assigned to the present invention are also achieved with the help of a ducted antitorque rotor for helicopters having a duct made of a fairing that is constituted at least in part by an absorbent structure as described above.

The objects given to the present invention are also achieved with the help of a fairing for helicopter portions, said fairing comprising an absorbent structure as described above.

BRIEF DESCRIPTION OF THE DRAWINGS

Other features and advantages of the invention appear in greater detail on reading the following description with the help of the accompanying drawings that are given purely by way of non-limiting illustration, and in which:

FIG. 1 shows an embodiment of a portion of a structure in accordance with the invention;

FIG. 2 shows an embodiment of an absorbent structure in accordance with the invention;

FIG. 3 shows another embodiment of an absorbent structure in accordance with the invention;

FIG. 4 shows another embodiment of an absorbent structure in accordance with the invention;

FIG. 7 is a cross-section of a helicopter ducted rotor having a duct provided with an absorbent structure in accordance with the invention together with a rotor hub that also includes an absorbent structure in accordance with the invention; and FIG. 8 is a diagram showing the noise absorption coefficient as a function of frequency, corresponding to an absorbent structure designed to process the frequencies F1 and F2=2×F1.

MORE DETAILED DESCRIPTION

Figure 5:
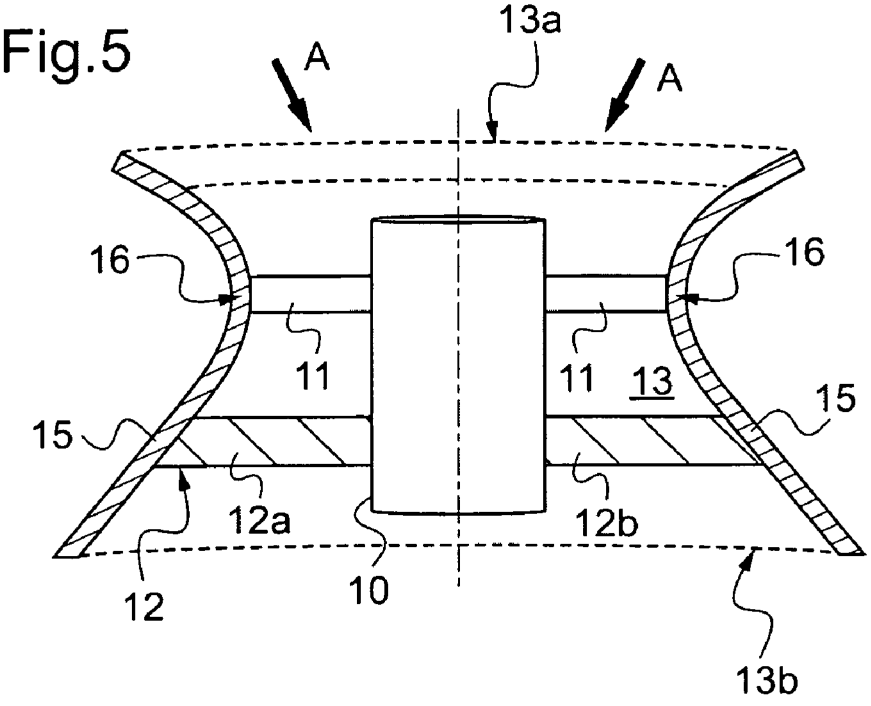
FIG. 5 is a diagrammatic cross-section view showing a ducted helicopter rotor arranged in a duct that includes an absorbent structure in accordance with the invention.

The absorbent structure in accordance with the invention, a portion of which is shown in FIG. 1, includes a rigid partition 1, e.g. of fiberglass, and upright partitions 2 extending substantially orthogonally from the rigid partition 1 in order to define cavities 3. The upright partitions 2, e.g. made of fiberglass, extend to a porous wall 4 and constitute separator means between the rigid partition 1 and the porous wall 4.

The cavities 3 present a height h1 of value that is proportional, to a good approximation, to the reciprocal of the basic frequency F that is to be absorbed, at a given temperature T. The following relationship:

$$h=c\times T^{1/2}\times 1/F$$

where c is a constant, F is the frequency to be absorbed, is itself known.

The value h corresponds substantially to one-fourth or a multiple of one-fourth of the wavelength of the frequency F that is to be absorbed.

The porous wall 4 has a first layer 4*a* of metal screen having fine or very fine mesh size and a second layer 4*b* constituted by a metal fiber felt. The screen and the felt may also be made of composite materials. The layers 4*a* and 4*b* are assembled together by welding or by adhesive bonding.

FIG. 2 shows an embodiment of the absorbent structure in accordance with the invention. This structure includes a second porous wall 5 located between the rigid partition 1 and the porous wall 4. Each of the cavities 3 is thus divided in two by means of the second porous wall 5.

The porous wall 5 is spaced apart from the rigid partition 1, lying at a height h2 that is less than h1. The height h2 is determined by the same relationships as that determining h1, as specified above.

The porous wall 5 is preferably identical or similar to the porous wall 4 and comprises a first layer 5*a* made of a fine-meshed metal screen, and a second layer 5*b* made of a metal fiber felt.

This absorbent structure serves to absorb two basic frequencies F1 and F2 that correspond to two distinct spectral lines in the noise that is to be attenuated.

FIG. 3 shows another embodiment of the absorbent structure in accordance with the invention. In this embodiment in accordance with the invention the additional absorption means comprise additional cavities 7 presenting a height h3 that alternate with cavities of height h1. The height h3 is likewise determined by the above-specified relationship.

The additional cavities 7 are obtained by depositing an absorbent material 7*a* on the rigid partition 1, in some of the cavities 3. By way of example, every other cavity 3 can thus be transformed into an additional cavity 7 presenting a height h3. In a variant, it is also possible to envisage transforming every third cavity or every fourth cavity into an additional cavity 7, for example.

The cavities 3 and the additional cavities 7 thus serve respectively to absorb soundwaves at distinct frequencies F1 and F3 in the emitted noise spectrum.

FIG. 4 shows another embodiment of the absorbent structure in accordance with the invention, in which the additional absorption means are obtained by sloping the rigid partition 1 relative to the porous wall 4. This gives rise to upright partitions 2 presenting different heights $h1_{(n)}$ going from one upright partition 2 to the next.

This produces particular cavities 8 presenting one upright partition 2 of height $h1_{(n)}$ and one adjacent upright partition 2 of height $h1_{(n+1)}$. The variation in height from one rigid partition to the next is naturally determined by the inclination of the rigid partition 1. Consequently, such an absorbent structure attenuates some of the spectrum lines of the emitted noise, and more preferably it attenuates a broad band of frequencies corresponding to so-called "broadband" noise.

FIG. 5 is a section view showing an embodiment of a ducted antitorque rotor for a helicopter. The antitorque rotor has a hub 10 driving blades 11.

Figure 6:
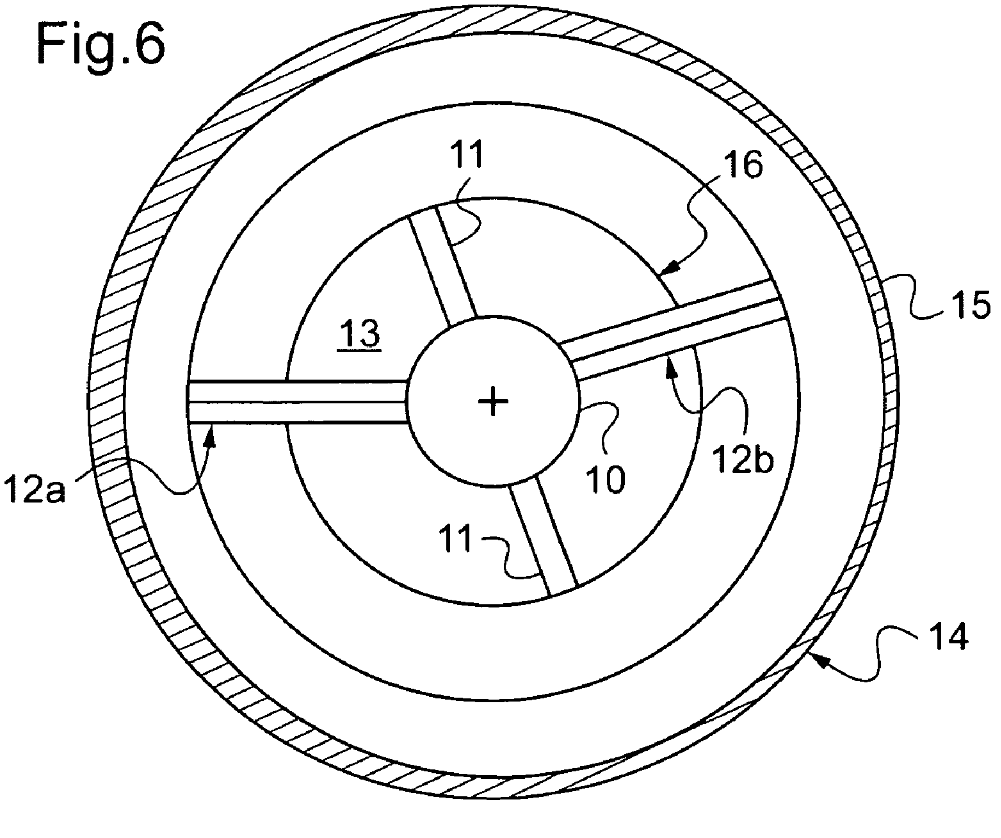
FIG. 6 is a diagrammatic elevation view corresponding to FIG. 5.

Support plates 12 are provided firstly for holding the hub 10 in position in a duct 13 through which air flows, and secondly for deflecting the air flow expelled by said rotor. This is performed by the support plates 12 having a particular orientation, e.g. a radial orientation for one of the plates 12*a*, and a quasi-radial orientation for the other supporting plate 12*b*, as shown for example in FIG. 6.

The air sucked in by the antitorque rotor is represented by arrows A. The sucked-in air penetrates into the airflow duct 13 via an inlet 13*a* of the duct 13, and it is expelled via an outlet 13*b* of the duct 13.

The inlet 13*a* and the outlet 13*b* of the duct 13 are defined by fairing 15 around the rotor 14. The fairing 15 is made by using elements of absorbent structure in accordance with the invention or by using elements covered in an absorbent structure in accordance with the invention.

The airflow duct 13 also has a throat 16 located around the trajectory of the tips of the blades 11.

By way of example, support plates 12*a* and 12*b* are provided on each of their faces with an absorbent structure in accordance with the invention. Preferably, all of the portions of the fairing 15 defining the airflow duct 13 include a covering of an absorbent structure in accordance with the invention.

As a variant, these portions may also be made directly out of absorbent structure elements. The elements then constitute rigid structural elements of the antitorque rotor.

FIG. 7 is a cross-section view through a ducted antitorque rotor of a helicopter, in which the hub 10 transmits rotary motion to the blades 11 by means of a transmission shaft 17. The hub 10 has a casing 10*a* and a cover element 10*b* that are covered in or constituted by an absorbent structure in accordance with the invention.

The airflow duct 13 is defined in particular by air inlet lips 18 and by a diffusion cone 19 covered in or constituted by an absorbent structure in accordance with the invention. The entire airflow duct 13 is preferably treated with the absorbent structure in accordance with the invention, i.e. it is covered therewith or constituted thereby.

The antitorque rotor as shown in FIG. 7 can also operate in a reverse mode with air flowing through the duct 13 in the reverse direction represented by arrows R. The airflow duct 13 conserves its noise attenuation properties in reverse mode also.

FIG. 8 applies to a particular embodiment of an absorbent structure in accordance with the invention and shows its absorption coefficient CA as a function of frequency F. In this particular case, the basic frequencies F1 and F2=2×F1, and also the frequencies 3×F1, 5×F1, and 3×F2 are attenuated 100%. Other harmonics, also attenuated 100% are omitted from the drawing for reasons of clarity. Frequencies in a broad band occupying approximately ±30% of the above-mentioned frequencies are also attenuated by at least 80%. This provides noise attenuation by at least 80% for frequencies lying in the range 2.1×F2 and 3.9×F2.

What is claimed is:

1. An absorbent structure for reducing the propagation of soundwaves emitted by noisy devices, the structure comprising:

a rigid partition, at least one porous wall, separator means for placing the porous wall at a determined distance from the rigid partition, defining cavities of a height h1 between said porous wall and said rigid partition, said height h1 being determined so as to obtain maximum absorption of the emitted soundwaves at a given basic frequency F1, and additional absorption means for obtaining maximum absorption of the emitted soundwaves at at least one additional basic frequency Fi, i being an integer greater than or equal to 2, wherein the at least one porous wall comprises at least a first layer constituted by a fine-mesh screen, and at least one second layer constituted by a fiber felt, wherein the additional absorption means comprise an alternation of cavities of height h1, and additional cavities of height h3, said height h3 being less than the height h1, and wherein the additional cavities are made by depositing an absorbent material on the rigid partition in some of the cavities of height h1.

2. The absorbent structure according to claim 1, wherein the screen and/or the felt are made of metal or composite materials.

3. The absorbent structure according to claim 1, wherein the first layer and the second layer are assembled together by welding or by adhesive bonding.

4. The absorbent structure according to claim 1, wherein the additional absorption means comprise at least one additional porous wall located in the cavities at an intermediate height h2 so as to obtain maximum absorption for a basic frequency F2.

5. An absorbent structure according to claim 1, wherein the additional absorption means are embodied by an inclination of the rigid partition relative to the porous wall so as to modify the height h1 in at least one direction on going from one particular cavity to the next.

6. The absorbent structure according to claim 1, wherein the cavities are defined with upright partitions extending substantially orthogonally from the rigid partition to a porous wall.

7. The absorbent structure according to claim 1, wherein the rigid partition is made at least in part out of fiberglass.

8. A duct for a helicopter antitorque rotor, wherein the duct is constituted, at least in part, by an absorbent structure in accordance with claim 1.

9. A ducted antitorque rotor for a helicopter, wherein the rotor includes a fairing constituted at least in part by an absorbent structure in accordance with claim 1.

10. A fairing for portions of a helicopter, wherein the fairing includes an absorbent structure in accordance with claim 1.

* * * * *